United States Patent Office 3,534,988
Patented Oct. 20, 1970

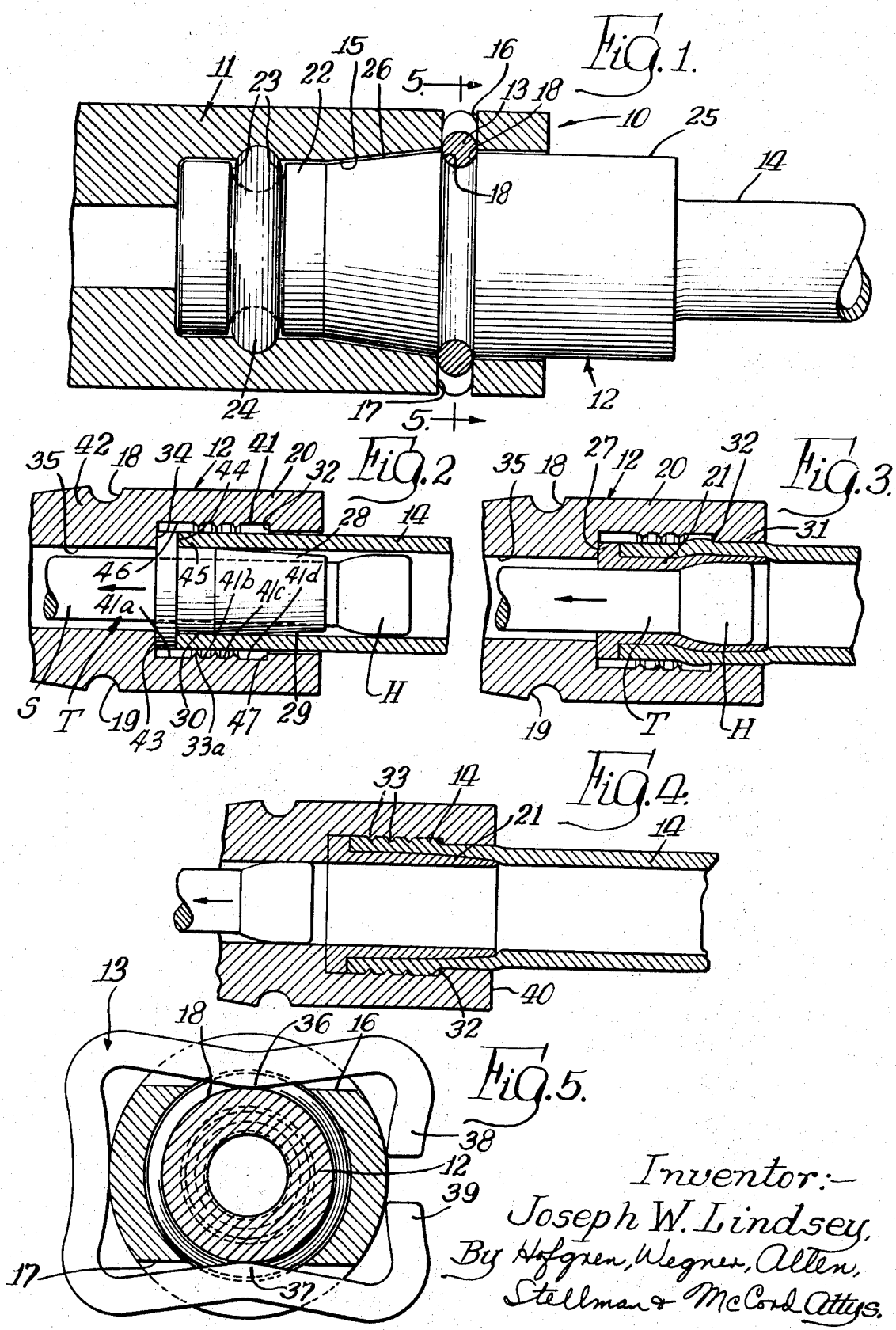

3,534,988
TUBE END MOUNTED SLEEVE
Joseph W. Lindsey, Holladay, Utah, assignor to I-T-E
Imperial Corporation, a corporation of Delaware
Filed Nov. 15, 1968, Ser. No. 776,153
Int. Cl. F16l 37/14
U.S. Cl. 285—305                 7 Claims

ABSTRACT OF THE DISCLOSURE

A tube fitting including a substantially rigid outer tubular shell and an expansively deformable tubular insert. The insert is enlarged subsequent to the placement thereof in the end of the tubing and within the shell to clamp the tubing end positively between the insert and shell to effect a make-up of the fitting. Shoulders are provided on the fitting for engaging the tubing end to bite into the tubing for improved retention thereof. The fitting elements are releasably retained in association by an improved locking means.

BACKGROUND OF THE INVENTION

Field of the invention

This invention relates to tube fittings.

Description of the prior art

In one form of conventional tube fitting, a coupling element is secured to the end of the tube and arranged to be removably sealingly connected to another element of the fitting. A number of different methods of connecting the first element to the tube end are utilized including brazing, constriction of the element onto the tube end, enlargement of the element into the tube end, clamping of the tube end between inner and outer elements, etc.

In those fitting utilizing means for clamping the tube end between inner and outer elements, different methods have been employed for effecting the clamped association of the elements including crimping the outer element onto the tube end with the inner element disposed coaxially therein, enlarging the inner element with the tube end disposed coaxially within the outer element, providing the inner element with a tapered leading portion, and forcing the inner element into the tube end disposed coaxially within the outer element, etc. The present invention is directed to the form of tube fittings wherein the inner element is expanded to clamp the tube end between the inner element and a substantially rigid outer element. The present invention is directed to avoiding several disadvantages found in the known fittings of this type, including the relative complexity thereof and relatively impositive retention of the hose end in the made-up fitting.

The fittings of the art further present a problem in connection with the retention of the elements of the fittings in locked sealed association. Certain tube fittings are arranged for releasable association of a portion of the fitting effectively permanently secured to the tube end and a second portion of the fitting. A number of releasable connecting devices have been developed for use with the different forms of fittings as discussed above. The known devices have had the serious disadvantages of relatively high cost and relative difficulty of manipulation. The present invention is directed to eliminating such disadvantages of the known tube fitting retaining means.

SUMMARY OF THE INVENTION

The present invention comprehends improved tube fitting structures eleminating the disadvantages of the known fittings as discussed above in a novel and simple manner.

More specifically, the present invention comprehends the provision in a tube fitting having a female connector portion, a male connector portion arranged to fixedly retain the end of a tube in removable association with the female connection portion, the male connector portion comprising a substantially rigid tubular shell arranged to coaxially receive the end of the tube, an expansively deformable tubular insert arranged to be coaxially received within the tube end, the insert being radially enlarged subsequent to receipt of the tube end thereabout in the shell to positively clamp the tube end between an outer surface of the insert and an inner surface of the shell, and means for retaining the male connector portion removably in the female connection portion of the fitting.

The insert may be suitably enlarged as by a swaging action which may be effected by suitably moving a swaging tool axially through the insert, by rotating a suitable tool within the insert, etc.

The fitting may be provided with shoulder means for improved retention of the tubing therein. The shoulder means may comprise annular shoulder means and, more specifically, may comprise annular ribs. The shoulder means may be provided in the form of a turned end flange. The insert may be provided with a base portion defining a turned end defining a relatively thick section. The base may serve as a means for limiting the insertion of the insert into the tube end. The base may serve as a means for limiting the radial enlargement of the insert by abutment of the base with the internal surface of the shell.

The insert may be arranged to be enlarged to have an internal diameter in the made-up arrangement of the fitting substantially equal to the internal diameter of the tubing end, thereby to provide an improved substantially unobstructed flow path through the fitting. The shell may have a reduced inner portion defining a shoulder for locating the insert within the shell. The inner shell shoulder portion may have an internal diameter substantially equal to the internal diameter of the tube end.

The shell and insert define a male connector portion of the fitting adapted to be fixedly retained on the tube end. The male connector portion is adapted to be removably received in a female connector portion of the fitting provided with improved means for releasably locking the connector portions in association. More specifically, the invention comprehends the provision of a new and improved structure for selectively locking the connector portions in coaxial association including means defining a recess in the male connector portion opening transaxially outwardly therefrom, means defining an opening transaxially through the female connector portion for selective alignment with the male connector portion recess, and a retainer carried by the female connector portion having a portion resiliently removably extending through the opening into the recess for selectively locking the connector portions in coaxial association.

The fitting is extremely simple and economical of construction while yet providing a positive permanently affixed male connector on the tube end permitting facilitated connection and disconnection to the female connector portion of the fitting.

BRIEF DESCRIPTION OF THE DRAWING

Other features and advantages of the invention will be apparent from the following description taken in connection with the accompanying drawing wherein:

FIG. 1 is a fragmentary diametric section of a fitting embodying the invention with a tube end connected thereto;

FIG. 2 is a fragmentary diametric section of the tube end and male connector portion of the fitting during a first step in the makeup of the fitting;

FIG. 3 is a diametric section similar to that of FIG. 2 illustrating a second step in the makeup of the fitting;

FIG. 4 is a diametric section similar to that of FIG. 3 illustrating a third step in the makeup of the fitting wherein the male connector is positively connected to the tube end; and FIG. 5 is a transverse section taken substantially along the line 5—5 of FIG. 1 illustrating the improved locking retainer means.

DESCRIPTION OF THE PREFERRED EMBODIMENT

In the exemplary embodiment of the invention as disclosed in the drawing, a fitting generally designated 10 formed of suitable material such as metal, plastic, etc., is shown to comprise a female connector element, or portion, 11 and a male connector element, or portion, 12 removably locked in association by a spring retainer 13. The male connector portion 12 is adapted to be permanently affixed to a tube end 14. The tube end 14 may comprise tubing of conventional construction formed of plastic, metal, etc. The present invention comprehends an improved fitting wherein the male connector portion 12 is adapted to be effectively positively secured in sealed association with such a tube end 14 permitting the tube to be readily connected and disconnected relative to the fitting portion 11 by ready association and disassociation of the male connector portion 12 relative to the female connector portion 11.

More specifically, as shown in FIG. 1, the female connector portion 11 is provided with a recess 15 complementary to the male connector portion 12 and having a pair of diametrically opposite chordal slots 16 and 17 opening into the recess 15. As shown in FIG. 5, the spring retainer 13 extends through the slots 16 and 17 into a groove 18 in the male connector portion 12. The groove 18 herein extends annularly about the tubular male connector portion 12 to permit the male portion 12 to be inserted in any position of rotation about its axis.

As best seen in FIG. 5, the spring retainer 13 comprises a C-clip having inturned leg portions 36 and 37 extending through the female connetcor portion openings 16 and 17 into the male connector portion groove 18 for releasably locking the fitting elements in coaxial association. The spring retainer 13 is preferably formed of a resilient material such as spring metal and in the illustrated embodiment comprises an elongated cylindrical wire member. The C-clip 13 may be provided with inturned distal ends 38 and 39 to effectively retain the C-clip in embracing relationship to the female member with the leg portions 36 and 37 yieldingly retained in the recess.

As shown in FIG. 3, the male connector portion 12 includes a substantially rigid tubular shell 20 and an expansible deformable tubuar insert 21 which cooperatively clamp the tube end 14 therebetween in the made-up condition of the fitting as shown in FIG. 4. As seen in FIG. 1, the shell 20 includes a cylindrical inner end 22 in which an annular groove 23 carrying an O-ring 24 is provided, an outer cylindrical portion 25 in which the insert 21 is coaxially received, and a frustoconical midportion 26. As shown, the external configuration of the male connector portion 12 is similar to the internal configuration of the female connector portion 11 defined by the recess 15.

Insert 21 comprises a tubular element having a base portion defined by an inner radially outturned flange 27 and a thin tubular outer clamp portion 28. Clamp portion 28 is adapted to be received within the tube end and in the illustrated embodiment has a frustoconical axially outwardly narrowing outer surface 29. As best seen in FIG. 2, the insert 21 may include a short outwardly cylindrical portion 30 between the flange 27 and outer portion 28. The diameter of portion 30 may be similar to the inner diameter of the tube end 14 whereby the frustoconical portion 28 defines a tapered nose permitting facilitated insertion of the insert into the tube end with the flange 27 limiting the insertion as shown in FIG. 3.

The shell portion 25 defines an annular radially opening recess 41 extending between an axially inturned outer end flange 31 having an inner diameter slightly larger than the outer diameter of the tube end 14 as best seen in FIG. 2 and an inner portion 42 of the shell portion 25. For improved positive retention of the tube end in the male connector portion 12, the inner corner 32 of the flange 31 may comprise an annular square corner which is embedded in the tube end as seen in FIG. 4 in the made-up condition of the fitting. For further improved retention of the tube end 14 in the male connector portion 12, ribs may be provided on the insert elements. In the illustrated embodiment, annular ribs 33 are shown projecting radially inwardly on the shell portion 25 to engage the outer surface of the tube end 14 in the made-up condition of the fitting as shown in FIG. 4.

The outer diameter of insert flange 27 may be generally similar to the outer diameter of the tube end 14. Thus, the insert may be installed in the tube end 14 and the assembly of the insert and the tube end extending thereabout freely inserted through the opening defined by flange 31 of the shell until insert flange 27 abuts an inner, outwardly facing planar annular shoulder 34 in shell 20 to accurately locate the tube end in relationship to the shell, as shown in FIG. 2. The tubular shell 20 further defines an inner bore portion 35 having a diameter similar to the inner diameter of the tube end 14 and opening axially outwardly from shoulder 34.

Thus, as seen in FIGS. 2 and 4, the shell defines a planar radial surface 34 which is in facial abutment with a complementary radial planar surface 43 defining the axially inner surface of the flange 27. The flange further defines an axially outer outturned surface 44 abutted by the distal end 45 of the tube end 14 during the make-up of the fitting. As further seen in FIG. 2, the shell 20 defines a cylindrical radial inwardly facing surface 46 extending coaxially outwardly from the planar surface 34 to the first annular rib 33a and, thus, extends to axially outwardly of the outturned surface 44. The ribs 33 effectively divide the recess 41 into a plurality of axially shorter recesses 41a, 41b, 41c and 41d. The axially outermost small recess 41d is defined by an axially outer surface 47 extending parallel to the radial planar surfaces 34 and 43.

To fixedly secure the male connector portion 12 to the tube end 14, the insert 21 is radially expanded. As discussed above, the expansion may be effected by any suitable means. In the illustrative embodiment, the expansion is effected by drawing a swaging tool T therethorugh, as illustrated in FIGS. 2–4. Alternatively, tool T may be inserted through the insert with the enlarged head H thereof disposed axially outwardly of the insert to be freely received in the tube end 14 when the insert is installed therein, as shown in FIG. 2. The shank portion S of the tool extends through the shell bore 35 when the assembled insert and tube end are installed in the shell, as shown in FIG. 2. The operator then merely draws the swaging tool outwardly, or to the left, as seen in FIG. 3, to force the head H against the inner surface of the insert thereby swaging the insert radially outwardly to the enlarged arrangement of FIG. 4. The outside diameter of the head H is preferably only slightly smaller than the inner diameter of the tube end 14 whereby the internal diameter of the enlarged insert is substantially equal to the internal diameter of the tube end 14 in the made-up condition of the fitting, as shown in FIG. 4. As the shell bore portion 35 has a similar diameter, a substantially constant diameter flow path is provided from the tube end 14 through the fitting.

The tube end 14 is expanded substantially radially outwardly in the made-up condition of the fitting, as shown in FIG. 4 and the tube end is positively clamped between the insert and shell with the shoulders 32 and 33 effectively biting into the outer surface of the tube end to retain the tube end positively secured to the male connector portion. Thus, the male connector comprises a portion of the fitting permanently fixed to the tube end permitting ready connection and disconnection of the tube end to the female portion 11 of the fitting. In connecting the male portion 12 to the female portion 11, the user need merely urge the male portion coaxially into the recess 15 with the frustoconical surface 26 of the male connector portion biasing the spring retainer 13 outwardly during this movement. To disconnect the male portion 12 from the female portion 11, the user need merely spread the C-shaped retainer legs 36 and 37 to space them outwardly of the groove 18 of the male connector whereupon the male connector may be readily axially withdrawn from the recess 15.

While I have shown and described one embodiment of my invention, it is to be understood that it is capable of many modifications. Changes, therefore, in the construction and arrangement may be made without departing from the spirit and scope of the invention.

What is claimed is:

1. In a tube fitting having a first connector portion, a second connector portion arranged to fixedly retain the end of a ductile tube in removable association with said first connector portion, said second connector portion comprising: a substantially rigid tubular shell coaxially receiving the end of the tube, said shell including a base portion having an axial bore having a diameter smaller than the inner diameter of the tube end, an end flange having an inner diameter at least as large as the outer diameter of the tube end, and an annular, radially inwardly opening recess extending between said base and said flange and defining at the end thereof at said base a radially planar end surface and at the end thereof at said flange a radially planar end surface extending perpendicular to the axis of the shell; an expansively deformable tubular insert coaxially received within the tube end, said insert having a base portion defining an end surface engaging said recess end surface and having a radial extent substantially equal to the radial extent of said recess end surface, said end surface of the insert base portion having an inner diameter in the undeformed original configuration less than the inner diameter of said recess end surface, said tubular insert further having a thin, tubular tube clamping portion extending from said base portion to at least the end of said fitting defined by said end flange, said clamping portion having a distal end having an outer diameter smaller than the inner diameter of the tube end and a tapered outer surface extending toward said base portion from said distal end to radially within said recess, said insert being radially expanded to the extent that said insert base portion and said tube extend into and substantially fill said radially inwardly opening recess of the shell to positively clamp the tube end between the outer surface of said insert and an inner surface of said shell, the inner diameter of the insert in the expanded arrangement thereof being substantially equal throughout to the inside diameter of the tube end; and means for retaining the second connector portion removably in the first connector portion of the fitting.

2. The fitting of claim 1 wherein radially projecting shoulder means are provided on at least one of the tubular fitting element, said shoulder means biting into said tube end in the made-up arrangement of the fitting.

3. The fitting of claim 1 wherein radially projecting shoulder means are provided on said shell, said shoulder means biting into said tube end in the made-up arrangement of the fitting.

4. The fitting of claim 1 wherein said base portion limits the insertion of the insert into the tube end and limits the radial enlargement of the insert by engagement with the inner surface of said shell in said recess.

5. The fitting of claim 1 wherein said inner surface of the shell is provided with symmetrical annular rib means spaced axially inwardly of said end flange.

6. The fitting of claim 1 wherein said insert distal end is partially embedded in the tube end in the made-up arrangement of the fitting and said flange inner diameter is cylindrical through the axial extent thereof.

7. The fitting of claim 1 wherein said insert is expanded progressively from one end thereof toward the opposite end thereof.

References Cited
UNITED STATES PATENTS

| 656,187 | 8/1900 | Gunnell | 285—258 X |
|---|---|---|---|
| 3,434,194 | 3/1969 | Whittaker et al. | 29—523 X |
| 1,508,026 | 9/1924 | Noble. | |
| 1,915,041 | 6/1933 | Wallace | 29—523 |
| 2,141,098 | 12/1938 | Wahlstrom | 29—523 X |
| 2,268,142 | 12/1941 | Lusher et al. | 285—258 |
| 3,314,696 | 4/1967 | Ferguson et al. | 285—305 |

FOREIGN PATENTS

| 149,232 | 12/1952 | Australia. |
|---|---|---|
| 1,294,438 | 4/1962 | France. |

DAVE W. AROLA, Primary Examiner

U.S. Cl. X.R.

285—382.4, 382.7